May 5, 1936.   A. T. VERSCHELDEN   2,039,693
WIRE STRETCHER
Filed Nov. 4, 1935   2 Sheets-Sheet 1
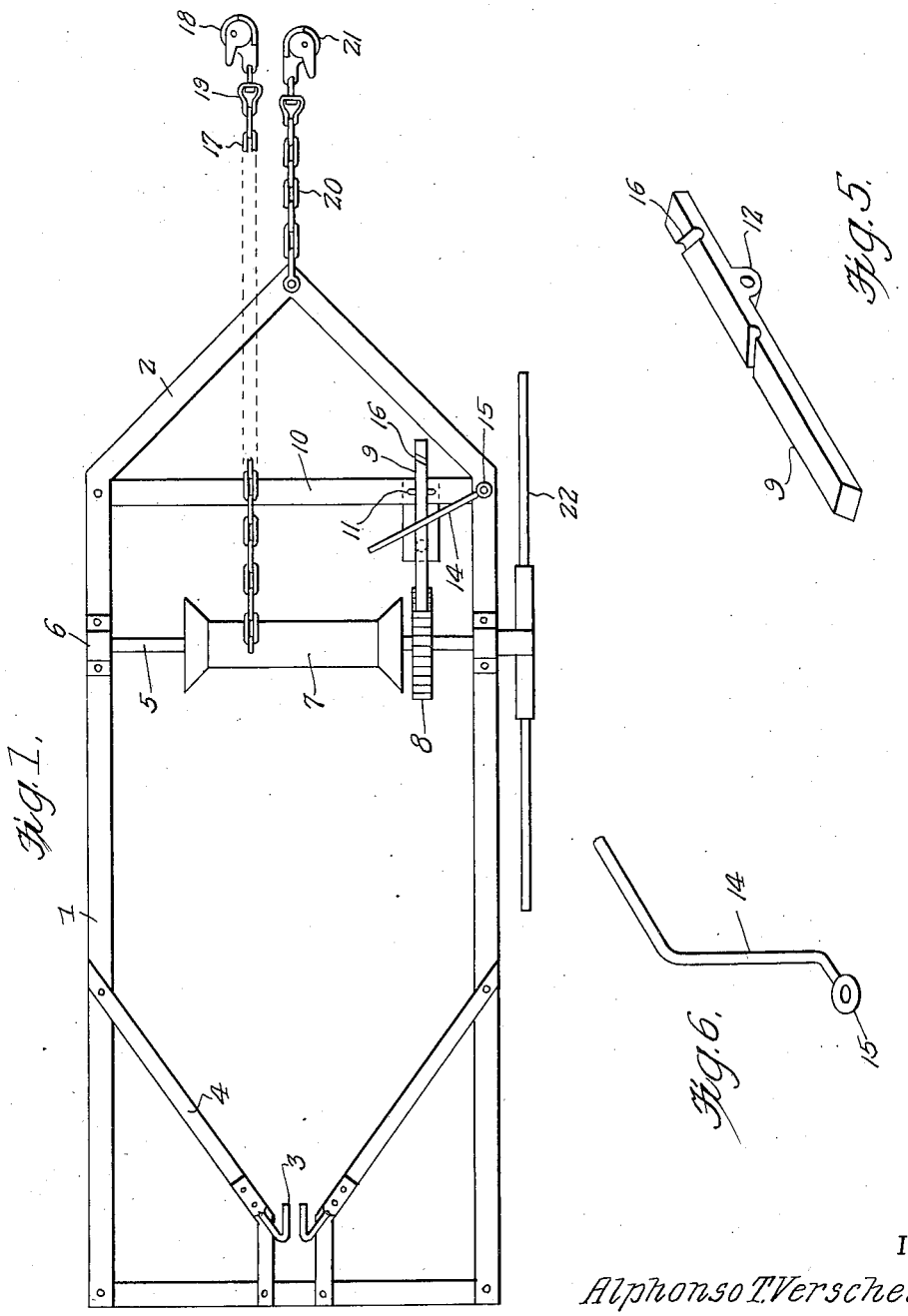
Inventor
Alphonso T. Verschelden,
By Clarence A. O'Brien and
Hyman Berman Attorneys

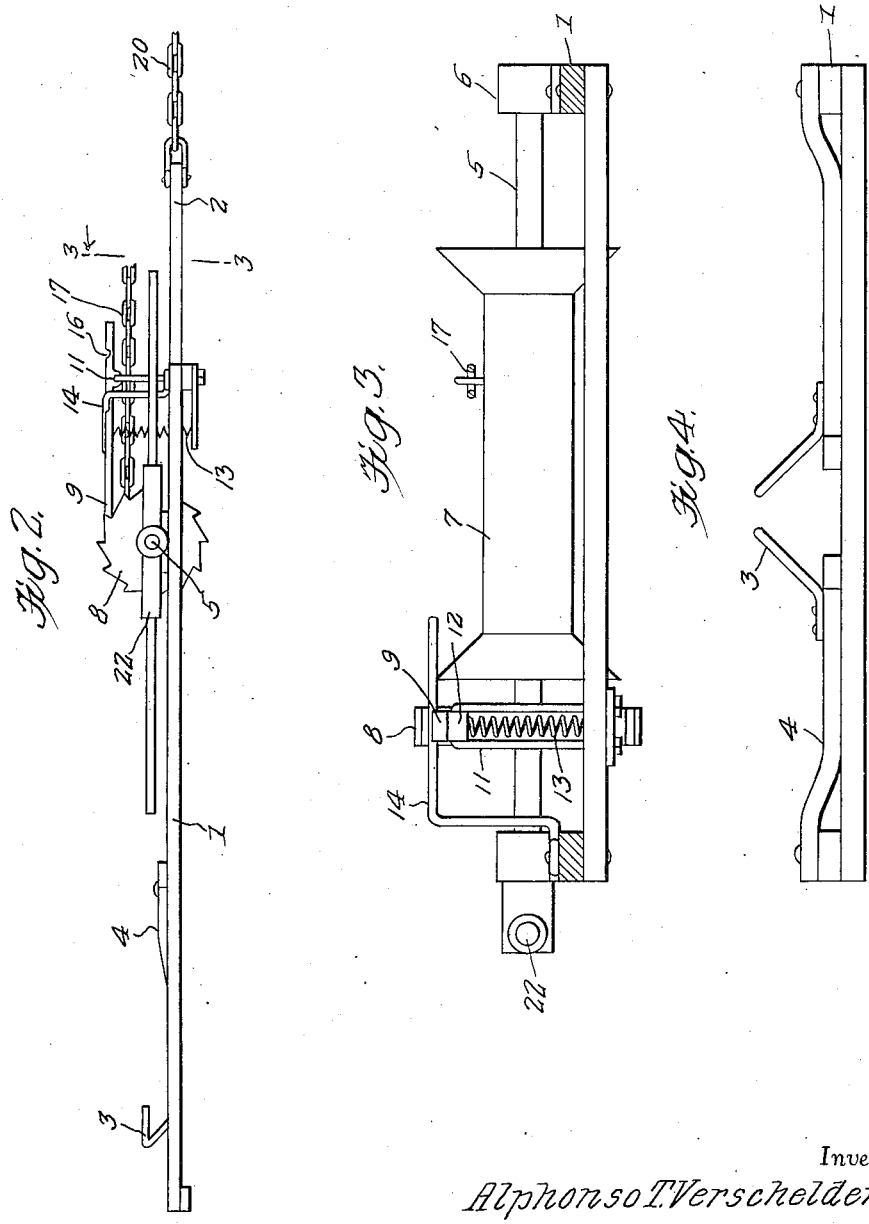

Patented May 5, 1936

2,039,693

UNITED STATES PATENT OFFICE 2,039,693

WIRE STRETCHER

Alphonso T. Verschelden, St. Marys, Kans.

Application November 4, 1935, Serial No. 48,236

2 Claims. (Cl. 254—161)

This invention relates to a wire stretcher, the general object of the invention being to provide a frame having a drum therein to which a flexible member carrying a clamp is connected, a second flexible member carrying a clamp attached to the frame for holding the wire after it has been partly stretched so that the member carried by the drum can be unwound and attached to the wire in a new place, with hooks at the opposite end of the frame for enabling another wire or a holding member to be connected with the frame.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the device.

Figure 2 is an edge view thereof.

Figure 3 is a section on the line 3—3 of Figure 2.

Figure 4 is a view of the hook carrying end of the device.

Figure 5 is a view of the ratchet dog.

Figure 6 is a view of the lever for holding the dog in either one of the two positions.

In these drawings the numeral 1 indicates a substantially rectangular frame having one end pointed as shown at 2 and with a pair of upwardly and inwardly extending hooks 3 arranged adjacent the other end, these hooks being carried by the frame parts 4 which are arranged as shown more particularly in Figure 1. A shaft 5 extends transversely across the front end thereof and is supported in the journals 6 attached to the side members of the frame and a drum 7 and a ratchet wheel 8 are secured to the shaft. A dog 9, shown in detail in Figure 5, is pivoted intermediate its end to the front cross piece 10 of the frame by a staple 11 the bight of which passes through a perforated ear 12 on the lower edge of the dog. Said dog engages the ratchet wheel and a spring 13 tends to hold the dog in engagement with the ratchet wheel but said dog may be held out of engagement with the ratchet wheel by a substantially Z-shaped lever 14, shown in detail in Figure 6, which is pivoted to the frame as shown at 15 and has a part for engaging either one of the grooves 16 in the dog. As will be seen one groove is located in front of the pivotal point 12 and the other in rear of said pivotal point so that when the lever engages the dog at a point adjacent the spring the dog will be held in engagement with the ratchet wheel but when the lever is engaging the opposite groove 16 the lever will be held out of engagement with the ratchet wheel so that the drum can freely rotate. A chain 17 is connected to the drum to be wound thereon and has a wire clamp 18, of any suitable form swivelled to its free end as shown at 19. A second chain 20 is connected to the pointed end of the frame and a clamp 21 is swivelled to this chain. A handle member 22 is connected to a projecting end of the shaft 5 for rotating the same.

The frame may be attached to a post or the like by a wire or the like passing over the hook 3 and then by gripping another wire with the clamp 18 and winding the drum the wire will be stretched. If the wire is not stretched sufficiently by winding the chain 17 on the drum, the clamp 21 can be clamped to the wire and then the clamp 18 released from the wire and the chain drawn from the drum and then the clamp 18 is placed in engagement with another part of the wire and by turning the drum the wire will be further stretched, it being seen that the chain 20 and the clamp 21 act as holding means for enabling the clamp 18 to take a new hold.

The device can also be used for connecting wires together, such as connecting a wire having a part in engagement with the hooks 3 and the wire drawn taut by the drum and chain 17, the ends of the wires located between the hooks 3 and the clamp 18 being attached together between the drum and said hooks 3.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A wire stretcher of the class described comprising a rectangular frame having one end pointed, a pair of upwardly and inwardly extending hooks supported by the frame adjacent the other end thereof, a cross piece at the junction of the pointed part of the frame with the rest of the frame, a transverse shaft journaled in the frame inwardly of the cross piece, a drum attached to the shaft, a chain attached to the drum and having a clamp at its outer end, a ratchet wheel connected with the shaft, a pivoted dog for engaging the wheel, a spring for normally holding the dog in engagement with the wheel, a pivoted lever for holding the dog in either one of the two positions, means for rotating the shaft, a chain connected with the pointed end of the frame and having a clamp at its outer end.

2. A wire structure of the class described comprising a frame, a pair of upwardly and inwardly extending hooks supported by the frame adjacent one end thereof, a drum journaled across the frame adjacent the other thereof, a flexible member attached to the drum, ratchet means associated therewith, a pivoted lever for holding the dog in either one of two positions, means for rotating the drum and a chain connected with the other end of the frame.

ALPHONSO T. VERSCHELDEN.